United States Patent [19]

Piehl et al.

[11] Patent Number: 5,396,427
[45] Date of Patent: Mar. 7, 1995

[54] METHOD AND APPARATUS FOR DETERMINING RELATIVE CONTRIBUTIONS OF INDIVIDUAL CYLINDERS OF INTERNAL COMBUSTION ENGINE

[75] Inventors: James R. Piehl; Robert D. Braun; Gary S. Wollert, all of Kenosha, Wis.; Craig F. Govekar, Gurnee, Ill.

[73] Assignee: Snap-on Incorporated, Kenosha, Wis.

[21] Appl. No.: 848,274

[22] Filed: Mar. 9, 1992

[51] Int. Cl.$^6$ ............................................. G01M 15/00
[52] U.S. Cl. ..................... 364/431.04; 364/431.07; 364/551.01; 364/565; 73/116; 73/518; 73/529; 324/161; 324/163; 324/379
[58] Field of Search ................ 364/431.03, 431.04, 364/431.07, 551.01, 565; 73/116, 488, 489, 518, 527, 529, 117.2, 117.3; 324/378, 379, 160, 163, 178, 161

[56] References Cited

U.S. PATENT DOCUMENTS

| | | | |
|---|---|---|---|
| 4,301,678 | 11/1981 | Full et al. | 73/116 |
| 4,348,893 | 9/1982 | Hendrix et al. | 73/116 |
| 4,525,781 | 6/1985 | Konomi et al. | 364/431.01 |
| 4,539,841 | 9/1985 | Schroeder et al. | 73/116 |
| 4,562,728 | 1/1986 | Timmerman | 73/116 |
| 4,625,546 | 12/1986 | Sugo et al. | 73/116 |
| 4,800,378 | 1/1989 | Putrow et al. | 340/722 |
| 4,843,870 | 7/1989 | Citron et al. | 73/116 |
| 5,056,360 | 10/1991 | Dosdall et al. | 73/116 |
| 5,182,512 | 1/1993 | Braun et al. | 324/378 X |
| 5,250,935 | 10/1993 | Jonker et al. | 364/431.04 X |

OTHER PUBLICATIONS

Snap-on Tools Corporation manual for MT3000 Engine Analyzer. No date.
Snap-on Tools Corporation manual for MT3000-420 Power Balance Probe. No date.

*Primary Examiner*—Kevin J. Teska
*Assistant Examiner*—Collin W. Park
*Attorney, Agent, or Firm*—Emrich & Dithmar

[57] ABSTRACT

A linearly moving external part of a multi-cylinder internal combustion engine is contacted with a hand-held contact tachometer for producing a waveform signal which, along with a signal responsive to the ignition of each cylinder, are applied to an engine analyzer processor for display of a single engine cycle of the waveform signal on the CRT oscilloscope of the engine analyzer. The variations and amplitude of the waveform signal correspond to speed variations of the moving part over an engine cycle to give an indication of the relative power contributions of the individual cylinders. Cylinder ignition markers and cylinder zone markers are respectively displayed at the top and bottom of the screen, respectively corresponding to the cylinders in their ignition order. Each cylinder zone marker is delayed a predetermined time from its corresponding cylinder ignition marker and indicates the time period during which the engine responds to the ignition event of the corresponding cylinder.

12 Claims, 3 Drawing Sheets

METHOD AND APPARATUS FOR DETERMINING RELATIVE CONTRIBUTIONS OF INDIVIDUAL CYLINDERS OF INTERNAL COMBUSTION ENGINE

BACKGROUND OF THE INVENTION

1. Field of the Invention

The present invention relates to analysis of the relative power contributions of individual cylinders of an internal combustion engine and, in particular, relates to techniques for determining such power contributions from variations in the engine speed.

2. Description of the Prior Art

The present invention is an improvement of the invention disclosed in copending U.S. application Ser. No. 604,191, filed Oct. 20, 1990, now U.S. Pat. No. 5,182,512. That application discloses a technique for determining cylinder power balance in an internal combustion engine. That technique involves utilizing a contact tachometer to detect the speed variations of an accessible external moving part of an engine, such as a fan belt or the like, the tachometer outputting a signal to an associated engine analyzer, which may be of the type sold by Snap-on Tools Corporation under the designation MT3000 and disclosed in copending U.S. application Ser. No. 587,357, filed Sep. 24, 1990, now U.S. Pat. No. 5,250,935. Such an engine analyzer includes a number of probes, adapted for connection to an associated engine, which can detect, among other things, the ignition events (spark plug firings in the case of gasoline engines or combustion signals/fuel pulses in the case of diesel engines) of each cylinder. The microprocessor of the engine analyzer utilizes the output of the contact tachometer to generate a waveform signal indicative of engine speed variations and displays a single engine cycle of that waveform signal, so that speed variations from one cylinder cycle to the next can be analyzed. In this regard, an engine cycle is the time period between consecutive ignition events of the same cylinder and a cylinder cycle is the time period from the ignition event of one cylinder to the ignition event of the next cylinder in the ignition firing order.

However, that prior system operates to display the waveform signal on a "Vacuum Waveform" display screen of the engine analyzer, which screen, in addition to the waveform, displays at the top of the screen indications of the cylinder ignition events in the ignition order and, at the bottom of the screen, indicates cylinder vacuum events in the vacuum order. Such a screen, designated by the numeral 10, is illustrated, for example, in FIG. 3, wherein the waveform signal is indicated at 11, the ignition event markers are indicated at 12 and the vacuum event markers are indicated at 13. The "Vacuum Waveform" screen is utilized for the waveform display since it is the only suitable display screen available with that engine analyzer, but it is not designed for the purpose of displaying instantaneous engine speed information. Accordingly, that screen displays a number of features and functions relating to vacuum waveforms which the operator has to disregard in viewing a power balance waveform. In particular, the vacuum event markers 13 introduce considerable confusion, since they are out of phase with the ignition event markers 12 by one-half an engine cycle. Accordingly, it is very difficult for an operator to determine the portion of the power balance waveform 11 which corresponded to the response of the engine to any particular cylinder ignition event and careful attention to the user's manual for the contact tachometer is absolutely required in order to understand its use in connection with the "Vacuum Waveform" display screen.

SUMMARY OF THE INVENTION

It is a general object of the present invention to provide an improved method and apparatus for determining cylinder power balance in an internal combustion engine, which avoids the disadvantages of prior techniques while affording additional structural and operating advantages.

An important feature of the invention is the provision of a method of determining cylinder power balance from engine speed variations during a single engine cycle, which is relatively simple and easy to perform.

In connection with the foregoing feature, another feature of the invention is the provision of the method of the type set forth which utilizes a digital engine analyzer and affords a simple and easily understood display of the power balance information.

Another feature of the invention is the provision of an apparatus for performing the method of the type set forth.

These and other features of the invention are attained by providing apparatus for determining the relative power contributions of individual cylinders of a multi-cylinder internal combustion engine, wherein an engine cycle is the time between consecutive ignition events of the same cylinder, the apparatus comprising: speed sensing means for detecting speed variations of the engine during an engine cycle and generating an electrical output signal indicative thereof, ignition sensing means for detecting the ignition events of each cylinder, processing means coupled to the speed sensing means and to the ignition sensing means and responsive to the output signal for generating a waveform signal representative of the speed variations of the engine over time, and display means coupled to the processing means for displaying a single engine cycle of the waveform signal, the processing means including means causing the display means to display cylinder zone markers equal in number to and respectively corresponding to the cylinders in their ignition order, each zone marker indicating the time period during which the engine responds to the ignition event of the cylinder corresponding to that zone marker.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
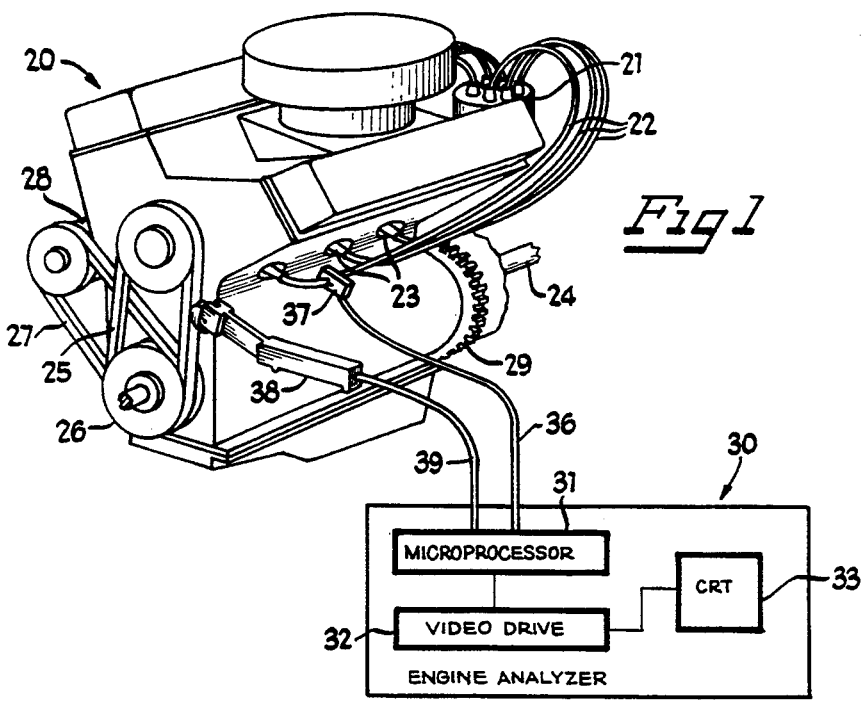
FIG. 1 is a block diagrammatic illustration of the apparatus of the present invention, coupled to an internal combustion engine shown in front perspective view, with portions broken away for clarity of illustration.

Referring to FIG. 1, there is illustrated a multi-cylinder internal combustion engine, generally designated by the numeral 20, of a type with which the present invention is useful. The engine 20 is shown as a V-6 gasoline engine, but it will be appreciated that the present invention may be used with any other configuration of multi-cylinder internal combustion engine. The engine 20 has a distributor 21 which is coupled by wires 22 to spark plugs 23, respectively positioned for igniting the fuel mixture in each of the several cylinders in standard fashion. The engine has an output crankshaft 24. A fan belt 25 is coupled to a pulley 26 at the front end of the crank shaft 24 for driving a cooling fan or other associated equipment. Similarly, a generator belt 27 is coupled to the pulley 26 for driving a generator or alternator 28. The crankshaft 24 is also coupled to a flywheel or ring gear 29 for coupling to an associated transmission (not shown) in a known manner.

The present invention includes an engine analyzer 30, which may be of the type sold by Snap-on Tools Corporation under its designation MT-3000, and includes a microprocessor 31 coupled to a video drive circuit 32 which is, in turn, connected to a CRT oscilloscope 33. The engine analyzer 30 may include a plurality of input leads, one of which is a conductor 36 coupled to a pickup 37, which may be an inductive or capacitive pickup and is adapted to be coupled to the wire 22 for the No. 1 spark plug 23, i.e., the spark plug for the cylinder which has been designated by the manufacturer as the first cylinder in the firing order. In the case of a diesel engine a piezoelectric pickup to sense fuel pulses, or known pickups for sensing combustion, may be used in a similar manner.

Engine speed is detected by a contact tachometer 38, which may be of the type disclosed in the aforementioned copending application Ser. No. 604,191, and the output of which is connected by a cable 39 to the microprocessor 31 of the engine analyzer 30. In operation, the encoder wheel of the contact tachometer 38 is held against one of the readily accessible, external, linearly moving parts of the engine 20, such as the fan belt 25. The encoder wheel rotates at a speed proportional to the linear speed of the moving engine part with which it is engaged, which latter speed is, in turn, proportional to the speed of the engine 20. The contact tachometer 38 responds to the rotation of its encoder wheel to generate an output signal which is in the nature of a fluctuating voltage, the amplitude of which is directly proportional to the speed of the engine 20. The signal is processed by the microprocessor 31, which in turn actuates the video drive circuit 32 to cause the CRT 33 to display a generally sinusoidal waveform which is indicative of the fluctuations in speed of the engine 20, as will be explained more fully below.

Figure 2:
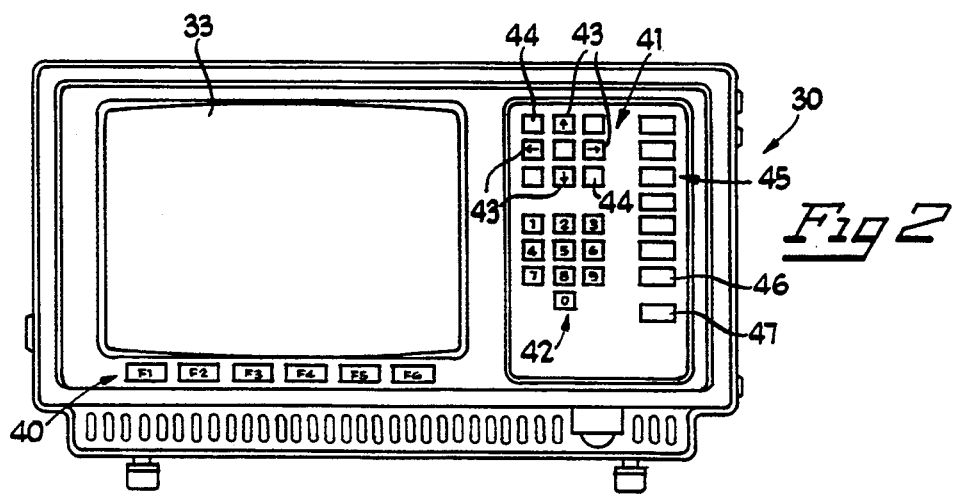
FIG. 2 is a front elevational view of the engine analyzer of the present invention, which is diagrammatically illustrated in FIG. 1.

Referring in particular to FIG. 2, the engine analyzer 30 has a set of six "soft" keys, F1 through F6, arrayed along the bottom edge of the CRT screen 33, the functions of which are software controlled and vary with the mode of operation of the engine analyzer 30, in a known manner. More specifically, the software for controlling the operation of the engine analyzer 30 causes an indication of each soft key function to be displayed on the screen immediately adjacent to the key.

Figure 3:
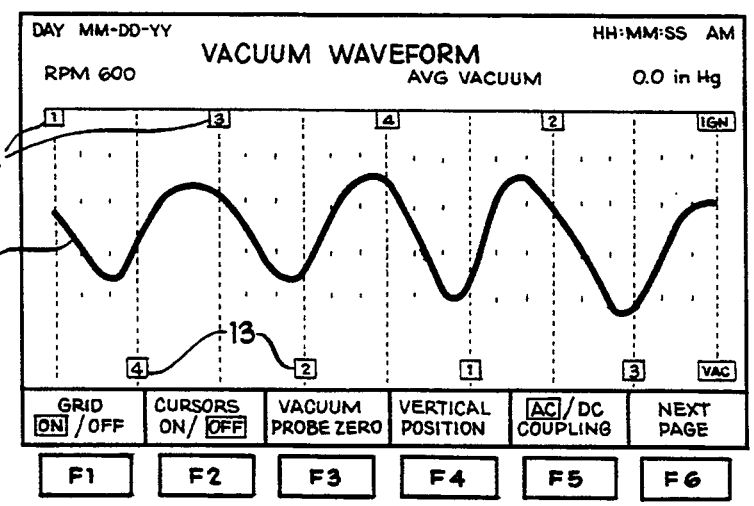
FIG. 3 is an elevational view of a screen display of a prior art engine analyzer.

The engine analyzer 30 also has a main keyboard 41 which includes: a numerical keypad 42 including ten keys for digits 0 through 9, respectively; four direction keys 43 for the directions up, down, right and left; four function keys 44; six menu keys 45; a reset key 46; and a HELP key 47. The functions of these various keys in controlling the operation of the engine analyzer 30 are described in greater detail in the aforementioned co-pending U.S. application Ser. No. 587,357, to produce a number of different types of screen displays, including that illustrated in FIG. 3. The present invention functions similarly to that disclosed in co-pending application Ser. No. 587,357, with the following exceptions, which now will be explained in connection with FIGS. 4–6.

Figure 4:
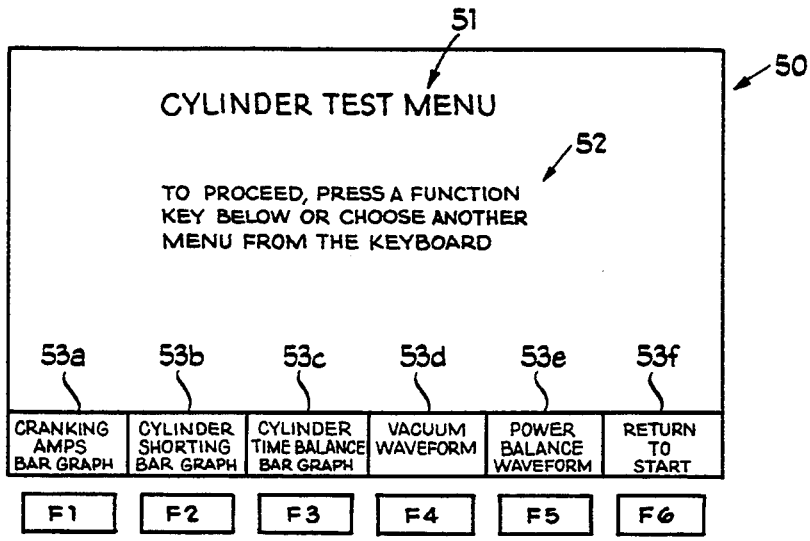
FIG. 4 is a elevational view of the screen display of the engine analyzer of FIG. 2.

After the engine analyzer has been coupled to an idling engine in the manner illustrated in FIG. 1, the operator, by actuating the appropriate one of the menu keys 45, calls up the Cylinder Test Menu illustrated in FIG. 4. This display includes a title at 51 and an instructional message at 52. This particular menu includes six options, selected by soft keys F1–F6, which are respectively labeled at 53a–53f as "Cranking Amps Bar Graph", "Cylinder Shorting Bar Graph", "Cylinder Time Balance Bar Graph", "Vacuum Waveform", "Power Balance Waveform" and "Return to Start". The "Power Balance Waveform" option, selected by key F5, is the only one which is pertinent to the present invention. When it is actuated, it calls up the Power Balance Waveform screen display 60, illustrated, in FIG. 5.

The "Power Balance Waveform" screen display 60 includes a title at 61 and an engine RPM display at 62. It also includes date and time displays at 63 and 64, respectively. The main portion of the display is a graph 65 which essentially plots engine speed along the vertical axis against time along the horizontal axis. The soft keys F1–F4 are respectively labeled at 66a–66d as "Grid On/Off", "Cursors On/Off", "Waveform Size Select" and "Vertical Position". The soft keys F1 and F2 both toggle between ON and OFF conditions, with the selected condition being highlighted in the corresponding label display 66a or 66b. When the grid is ON, vertical and horizontal grid lines 67 appear on the graph 65 to facilitate reading the graph.

Figure 5:
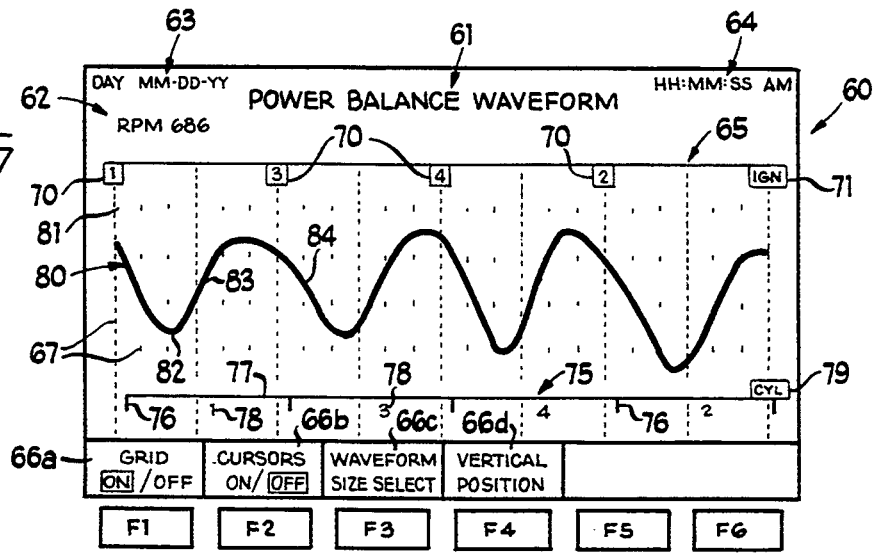
FIG. 5 is an elevational view of another screen display of the engine analyzer of FIG. 2, illustrating a normal power balance waveform.

The screen 60 also includes ignition event markers 70, which comprise highlightable numbers at equidistantly spaced apart points along the top of the graph 65, respectively corresponding to the engine cylinders in their firing order. For purposes of illustration, the display for a four-cylinder engine is illustrated in FIG. 5. The ignition event markers 70 respectively appear at the times along the graph 65 at which the ignition events for the corresponding cylinders occur, i.e., when the ignition pulse is applied to the cylinder. In horizontal alignment with the ignition event markers 70 at the right-end of the graph 65 is the highlighted designation "IGN" indicated at 71, which designates the function of the ignition event markers 70.

It is a significant aspect of the invention that the screen 60 also includes cylinder zone indicia 75 along the bottom of the graph 65. These indicia comprise a plurality of equidistantly spaced-apart markers 76 in the form of short vertical lines, respectively marking the beginnings of each of the cylinder zones, these markers 76 being interconnected by a horizontal line 77. The numbers of the cylinders, in their firing order, are indicated at 78, respectively in the centers of the cylinder zones, i.e., substantially midway between adjacent markers 76. At the right-hand end of the horizontal line 77 appears the highlighted designation "CYL", indicated at 79, to designate the function of the cylinder zone indicia 75.

Each cylinder zone on the graph 65 represents the time period during which the engine will respond to the ignition event for that cylinder. Thus, for example, cylinder zone 1 is the time period during which the engine is responding to the ignition of cylinder 1, and that zone ends with the ignition of cylinder 3, which is next in the firing order, whereupon the engine will respond to the cylinder 3 ignition. It will be noted that the start of each cylinder zone, as indicated by the cylinder zone indicia 75, is delayed or offset a slight distance in time from the ignition event for that cylinder, as indicated by the ignition event markers 70. This is because there is a certain time delay from the time the ignition pulse is applied to a cylinder until ignition occurs and the engine actually starts to respond by the corresponding piston starting its power stroke. This offset is predetermined, based on the particular type of engine being analyzed, and will typically correspond to at least a 20° rotation of the engine crankshaft 24.

The output of the contact tachometer 38 is displayed as a waveform 80 on the graph 65. More specifically, one complete engine cycle of the waveform 80 is displayed and, as can be seen, fluctuates in a generally sinusoidal manner. The reason that the waveform 80 and, accordingly, the speed of the moving engine part being monitored fluctuate, is the intermittent nature of the power source, i.e., the discrete ignition events of individual cylinders spaced apart in time. This results in a cyclical acceleration and deceleration of the engine crankshaft 24. Each time a cylinder ignition event occurs, the engine 20 first accelerates and then decelerates until the ignition event for the next cylinder.

The waveform 80 represents a four-cylinder engine 20 which is operating normally. The ignition of the No. 1 cylinder occurs at 81, as indicated by the corresponding ignition event marker 70. This ignition event is reflected in the movement of the engine at 82 in the waveform 80, which marks the initiation of the power stroke for the No. 1 cylinder. The engine responds by accelerating during the power stroke, as at 83, to a peak speed, and then begins to slow down or coast, as at 84, until the ignition for the next cylinder in the firing order, which is the No. 3 cylinder. As can be seen, the amplitudes of the peaks of the waveform 80 are generally the same, indicating that each of the cylinders is contributing approximately the same power to the overall engine output, which is the desired performance. It will be appreciated that, if the amplitudes of the waveforms are at the same setting, as determined by the "Waveform Size Select" function actuated by soft key F3, the changes in engine speed and, therefore, the overall amplitude of the waveform 80 will be less for an engine with more cylinders. This is because the time interval between cylinder firings is smaller, leaving less time for the engine to slow down between engine firings.

It is a significant aspect of the present invention that the points on the waveform 80 corresponding to cylinder ignitions are relatively easy to identify because of the cylinder zone indicia 75. More specifically, the first low point in the waveform 80 within a given cylinder zone, corresponds to the ignition of that cylinder. Thus, for example, if the operator starts at the left-end of the line 77, which is the beginning of the cylinder 1 zone, and progresses along that zone, the first low point in the waveform 80 is at 82 and, therefore, this corresponds to the ignition of cylinder No. 1 and marks the beginning of its power stroke.

Figure 6:
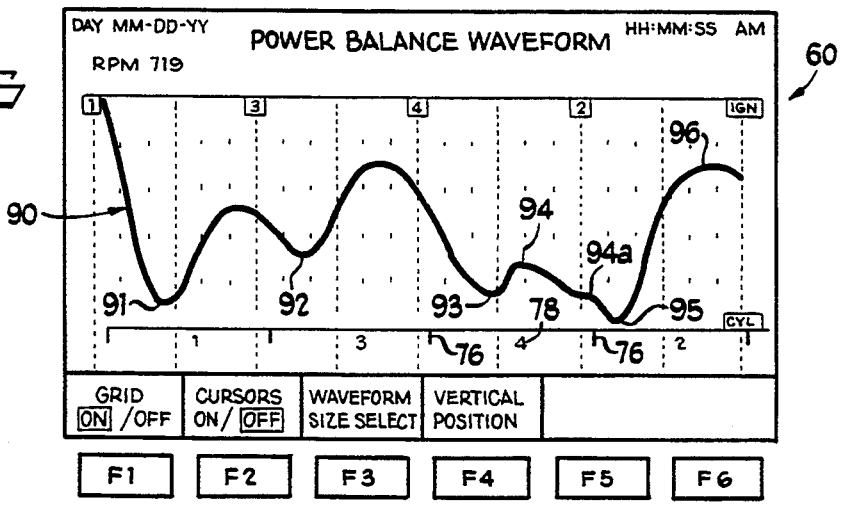
FIG. 6 is a view similar to FIG. 5, illustrating an abnormal power balance waveform.

While the ignition points of the cylinders along the waveform 80 are not too difficult to identify in a normal-operating engine, this is usually not the case for an abnormally-operating engine. The waveform 90 for such an abnormally-operating engine is illustrated in FIG. 6 and, as can be seen, is much more irregular than the waveform 80. In order to identify the cylinder ignitions, the operator looks for valleys of the waveform within each of the cylinder zones. Thus, the valley at 91 marks the ignition of the No. 1 cylinder. The engine responds by accelerating and decelerating until the ignition of the No. 3 cylinder at 92. The next valley occurs at 93 in the cylinder No. 4 zone, and marks the ignition of that cylinder. It will be noted that this ignition occurs somewhat later then the earlier ignitions and the engine responds by accelerating very little to a peak 94, then starts to decelerate to the ignition of the No. 2 cylinder at 95. After the firing of the No. 4 cylinder, it accelerates further to 96 in response to the firing of the No. 2 cylinder.

This waveform 90 indicates that the No. 4 cylinder is malfunctioning and that that cylinder is not contributing the proper amount of power to the engine. This power drop could result not only from a misfiring, but also from mechanical or fuel system problems. Whatever the source, the faulty cylinder can be identified. It can be seen that there is a leveling off of the waveform 90 at 94a and, in the prior art engine analyzer, an operator might mistake this for the ignition event of a No. 2 cylinder and conclude that there were problems with both the Nos. 4 and 2 cylinders. However, with the present invention, it is clear that this is not an ignition event for the No. 2 cylinder, since it does not occur in the No. 2 cylinder zone.

As can be readily appreciated, the advantages afforded by the cylinder zone indicia 75 of the present invention are even more significant, the greater the number of cylinders in the engine, since the peaks and valleys of the waveform will be even closer together. As can be seen from the waveform 90, although there is a problem in only one cylinder, this affects the shape of the waveform in other cylinder zones. It will be appreciated that if more than one cylinder is faulty the waveform can become extremely erratic. In such a case, the proper analysis of the waveform can be extremely difficult with prior engine analyzers and, therefore, in such cases the present invention is even more advantageous to the operator.

Figure 7:
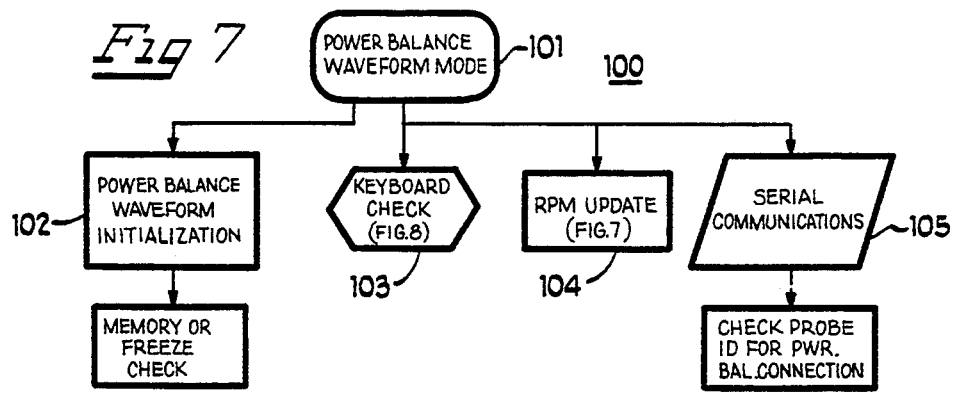
FIGS. 7–9 are flow charts of the computer program for the microprocessor of the engine analyzer of FIG. 1.
Figure 8:
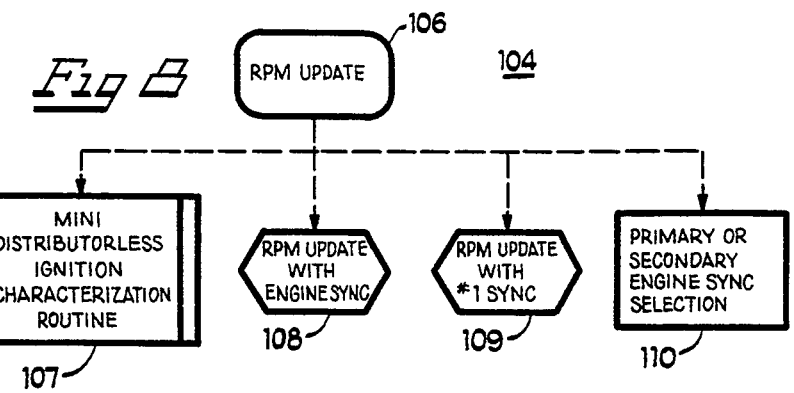
Figure 9:
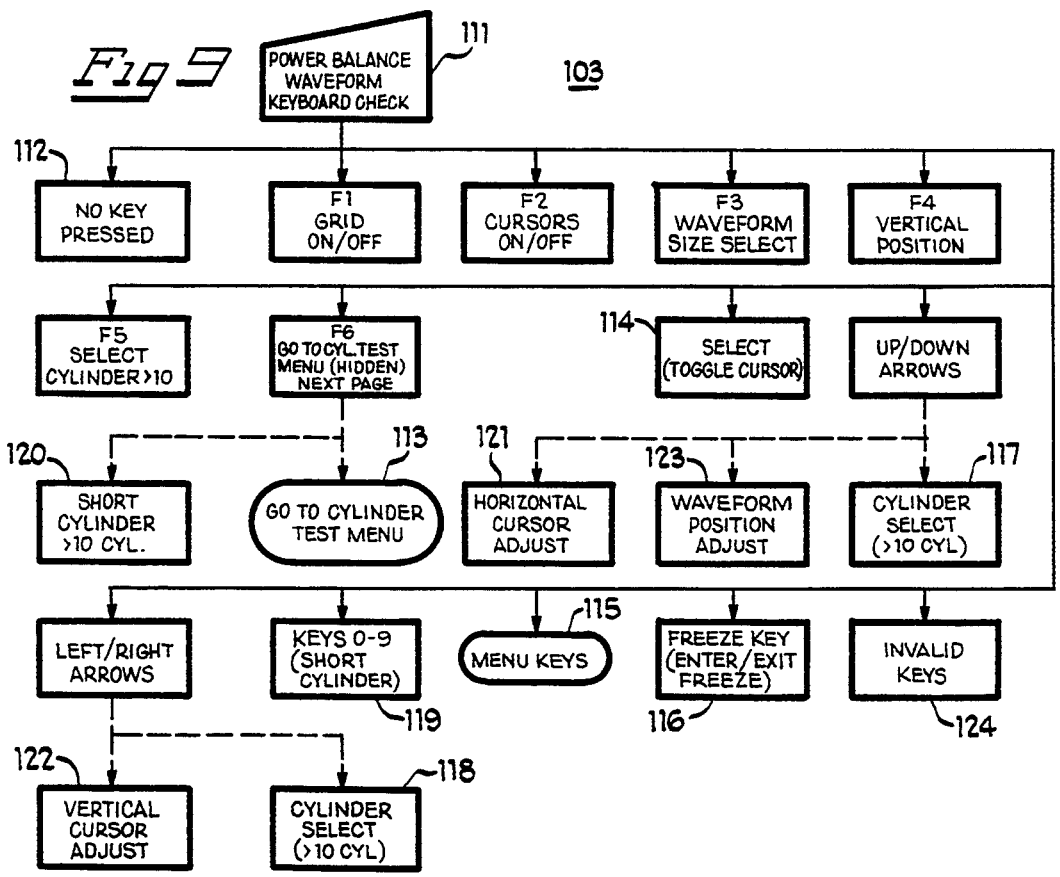

Referring now to FIGS. 7-9, the operation of the program 100 for the microprocessor 31 in response to selection of the "Power Balance Waveform" mode from the Cylinder Test Menu of FIG. 4 will be described. When the function key F5 is actuated, the program enters the Power Balance Waveform mode at 101 (FIG. 7) and first goes through an initialization sequence at 102 and then performs a memory or freeze check to determine if the screen is to display a live waveform, which is the default condition, or if this is to be a display of a previously-frozen screen, or if the waveform to be displayed is one previously saved in long term memory. The program also performs a keyboard check at 103, an engine RPM update at 104 to ascertain and display the current engine RPM and a serial communications routine at 105, whereby the information to be displayed is passed to the display board in the engine analyzer 30 for driving the CRT screen 33. In this routine, the program also checks the probe ID to see that the contact tachometer 38 is properly connected.

Referring to FIG. 8, the RPM update routine 104 is entered at 106 and proceeds to 107 to determine if the engine to which the engine analyzer 30 is connected is a distributorless ignition engine, in which case different probe inputs will have to be read, as is explained in greater detail in the co-pending aforementioned application Ser. No. 587,357. The program also does an RPM update, utilizing the Engine Sync signal at 108 or the #1 sync signal at 109, depending upon whether a primary or secondary sync signal is being used, as selected by the routine at 110.

Referring to FIG. 9, the keyboard check routine 103 is described in greater detail. This routine is entered at 111 and proceeds to scan the soft key set 40 in the main keyboard 41 to determine which, if any, keys have been actuated. If none have been actuated, the program simply proceeds to 112 and will continue in the main loop of the program as is described more fully in the copending application Ser. No. 587,357. Although the F6 soft key has no label on the Power Balance Waveform screen 60, illustrated in FIG. 5, it has a hidden or non-displayed function which will return the screen to the Cylinder Test Menu display 50 of FIG. 4, as indicated at 113. The screen display 60 at FIG. 5 is provided with a pair of vertical cursors and a pair of horizontal cursors (not shown), with one cursor of each pair being active at a time, the active ones being selectable by toggling the SELECT key, which is one of the function keys 44, this function being indicated at 114.

If one of the menu keys 45 is pressed, the program will move to 115 and call up the corresponding menu screen. If the FREEZE key, which is one of the function keys 44, is pressed, the program will move to 116 and toggle, i.e., either enter or exit the FREEZE mode.

If the engine to which the engine analyzer 30 is connected has more than ten cylinders, as indicated by the engine identification information entered by the user during setup, the F5 and F6 soft keys will respectively have labels "Select Cylinder" and "Short Cylinder" displayed on the Power Balance Waveform screen 60. In this case, if the F5 soft key is pressed, its label will be highlighted and the directional keys 43 will be operative to select a cylinder. The number of the selected cylinders in the ignition event markers 70 will be highlighted. Thus, a higher or lower numbered cylinder can be selected by using the up or down arrows, as at 117, or by using the right and left arrows, as at 118. Any cylinder up to ten can also be selected by using the numerical keypad 42, as indicated at 119. Once a cylinder has been selected (the program will default to selection of the No. 1 cylinder upon actuation of the F5 soft key), subsequent actuation of the F6 soft key will cause the selected cylinder to be shorted at 120.

If the engine does not have more than ten cylinders, then the direction keys 43 have other functions, controlled by the F2 and F4 soft keys. If the cursors are toggled ON by the F2 soft key, then the program will move the horizontal cursor at 121 in response to actuation of the up and down arrow keys, and will move the vertical cursor at 122 in response to actuation of the left and right arrow keys. If the F4 soft key is actuated, the program will adjust the vertical position of the waveform at 123 in response to the actuation of the up and down arrow keys. In this regard, it will be appreciated that the F2 and F4 soft keys are mutually exclusive, i.e., only one can be active at a time. Thus, for example, if the F4 soft key label is illuminated and the F2 key is depressed to toggle the cursors ON, the F2 soft key label will be illuminated and that for the F4 soft key will be extinguished so that the up/down arrow key can have only one function at a time.

If any other key is pressed the program recognizes it at 124 as an invalid key and gives a suitable indication.

From the foregoing, it can be seen that there has been provided an improved apparatus and method for determining the relative power contributions of individual cylinders of a multi-cylinder internal combustion engine which is much easier to use than prior techniques.

We claim:

1. Apparatus for determining relative power contributions of individual cylinders of a multi-cylinder internal combustion engine, wherein an engine cycle is a time period between consecutive ignition events of the same cylinder, said apparatus comprising:
   (a) speed sensing means for detecting speed variations of the engine during an engine cycle and generating an electrical output signal indicative thereof,
   (b) ignition sensing means for detecting the ignition events of each cylinder,
   (c) processing means coupled to said speed sensing means and to said ignition sensing means and responsive to said output signal for generating a waveform signal representative of the speed variations of the engine over time, and
   (d) display means coupled to said processing means for displaying a single engine cycle of the waveform signal from which said relative power contributions are determined,
   said processing means including means for causing said display means to display cylinder zone markers equal in number to and respectively corresponding to the cylinders in their ignition order, each zone marker indicating a time period during which the engine responds to the ignition event of the cylinder corresponding to that zone marker.

2. The apparatus of claim 1, wherein said speed sensing means includes means for detecting speed variations of an accessible external moving part of the engine.

3. The apparatus of claim 2, wherein said speed sensing means includes means for detecting linear speed of the moving part.

4. The apparatus of claim 3, wherein said speed sensing means includes a contact tachometer.

5. The apparatus of claim 1, wherein said processing means includes means for causing said display means to display cylinder zone markers comprising a plurality of substantially equidistantly spaced-apart indicators respectively positioned at the beginnings of the cylinder zones and corresponding cylinder numbers displayed respectively substantially in the middles of the cylinder zones.

6. The apparatus of claim 5, wherein said display means includes a CRT screen, said processing means including said means for causing zone markers to be displayed adjacent to the bottom of the screen.

7. The apparatus of claim 5, wherein said processing means includes means for causing ignition event markers to be displayed at locations respectively corresponding to the times of the ignition events of the cylinders.

8. The apparatus of claim 7, wherein said ignition event markers include cylinder numbers displayed in the ignition order.

9. The apparatus of claim 7, wherein said processing means includes means causing said cylinder zone markers to be respectively offset in time from the corresponding cylinder ignition event markers by a predetermined time period.

10. A method for determining relative power contributions of individual cylinders of a multi-cylinder internal combustion engine, wherein an engine cycle is a time period between consecutive ignition events of the same cylinder, and wherein a cylinder cycle is the time period from the ignition event of one cylinder to the ignition event of the next cylinder in the ignition order, said method comprising the steps of:

(a) detecting speed variations of the engine during an engine cycle and generating an electrical output signal indicative thereof,
(b) detecting the ignition events of each cylinder,
(c) processing the output signal to generate a waveform signal representative of the speed variations of the engine over time,
(d) displaying the waveform signal as a graph in which speed and time are respectively measured along orthogonal axes such that the cylinder cycles occupy substantially equal distances along the time axis,
(e) displaying adjacent to the graph cylinder zone markers respectively corresponding to the cylinder cycles, and
(f) determining said relative power contributions by comparing the cylinder cycles of the waveform during a single engine cycle.

11. The method of claim 10, wherein the detecting step includes detecting speed of an accessible external moving part of the engine.

12. The method of claim 11, wherein the detecting step includes detecting linear speed of the moving part.

* * * * *